(12) United States Patent
Hugonnot et al.

(10) Patent No.: US 10,133,150 B2
(45) Date of Patent: Nov. 20, 2018

(54) OPTICAL PARAMETRIC ULTRASHORT PULSE AMPLIFIER

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE LILLE 1 SCIENCES ET TECHNOLOGIES, Villeneuve d'ascq (FR)

(72) Inventors: Emmanuel Hugonnot, Talence (FR); Patrick Beaure D'Augeres, Pessac (FR); Damien Bigourd, Saint-Pol sur Mer (FR); Arnaud Mussot, Hellemmes (FR); Alexandre Kudlinski, Salome (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQE, Paris (FR); UNIVERSITE LILLE I SCIENCES ET TECHNOLOGIES, Villeneuve d'ascq (FR)

( * ) Notice: Subject to any disclaimer, the term of this patent is extended or adjusted under 35 U.S.C. 154(b) by 169 days.

(21) Appl. No.: 15/115,575

(22) PCT Filed: Jan. 30, 2015

(86) PCT No.: PCT/EP2015/051896
§ 371 (c)(1),
(2) Date: Jul. 29, 2016

(87) PCT Pub. No.: WO2015/114075
PCT Pub. Date: Aug. 6, 2015

(65) Prior Publication Data
US 2018/0046060 A1 Feb. 15, 2018

(30) Foreign Application Priority Data

Jan. 31, 2014 (FR) ...................................... 14 50793

(51) Int. Cl.
*G02F 1/39* (2006.01)
(52) U.S. Cl.
CPC .......... *G02F 1/39* (2013.01); *G02F 2001/392* (2013.01)
(58) Field of Classification Search
CPC ............................. G02F 1/39; G02F 2001/392
See application file for complete search history.

(56) References Cited

U.S. PATENT DOCUMENTS

| 6,181,463 | B1 * | 1/2001 | Galvanauskas | ........... G02F 1/39 359/330 |
| 8,390,921 | B2 * | 3/2013 | Kaertner | ................... G02F 1/39 359/330 |

(Continued)

FOREIGN PATENT DOCUMENTS

| WO | WO 2009/108844 A1 | 9/2009 |
| WO | WO 2011/106752 A2 | 9/2011 |

OTHER PUBLICATIONS

International Search Report dated Apr. 14, 2015 in PCT/EP2015/051896.

(Continued)

*Primary Examiner* — Daniel Petkovsek
(74) *Attorney, Agent, or Firm* — Oblon, McClelland, Maier & Neustadt, L.L.P.

(57) ABSTRACT

An optical parametric amplification device, including: an emitter emitting non-monochromatic light pulses as a pump wave; a stretcher configured to receive as an input pump wave, and to output a stretched pump wave; and a wave- (Continued)

guide configured to receive as an input the stretched pump wave and chirped pulses, and to provide a wave resulting from a four wave mixing.

13 Claims, 4 Drawing Sheets

(56) References Cited

U.S. PATENT DOCUMENTS

| | | |
|---|---|---|
| 8,964,098 B2 | 2/2015 | Aoki et al. |
| 2010/0321767 A1 | 12/2010 | Borguet et al. |
| 2011/0273763 A1 | 11/2011 | Kaertner et al. |
| 2014/0333994 A1* | 11/2014 | Hugonnot ............ G02F 1/3536 359/330 |

OTHER PUBLICATIONS

Wang He-Lin, et al., "Optical Parametric Chirped Pulse Amplification Based on Photonic Crystal Fibre" Chinese Physics B, vol. 20, No. 8, XP020209190, Aug. 5, 2011, pp. 084208-1-084208-4.

Damien Bigourd, et al., "High Gain Fiber Optical Parametric Chirped Pulse Amplification of Femtosecond Pulses at 1 um" Optical Society of America, XP031891728, May 1, 2011, pp. 1-2.

Patrick Beaure d' Augères, et al., "Amplification of Ultrashort Optical Pulses in a Two-Pump Fiber Optical Parametric Chirped Pulse Amplifier" Optical Society of America, XP032602484, Jun. 9, 2013, pp. 1-2.

Kyung-Han Hong, et al., High-Energy, Phase-stable, Ultrabroadband kHz OPCPA at 2.1 um Pumped by a Picosecond Cryogenic Yb:YAG Laser Optics Express, vol. 19, No. 16, Jul. 28, 2011, 11 Pages.

\* cited by examiner

OPTICAL PARAMETRIC ULTRASHORT PULSE AMPLIFIER

TECHNICAL FIELD

The present invention relates to the field of optical parametric chirped pulse amplifiers, in particular fibre amplifiers.

STATE OF PRIOR ART

Fibre optical parametric chirped pulse amplifiers (FOPCPA) are known in prior art.

These amplifiers, by virtue of their fibre architecture, have a reduced overall space, a high robustness, and afford low-price industrialisation to be contemplated.

In FIG. 1 is illustrated a fibre optical parametric chirped pulse amplification system.

A source 10 emits short pulses, typically of a duration of several hundreds of femto-seconds. These pulses are called an "input signal wave", referenced $S_0$.

Each pulse of the input signal wave is temporally stretched using a stretcher 11, to provide a pulse of a stretched signal wave $S_{0e}$. This is a temporal stretching, which consists in temporally stretching the different spectral contributions of a pulse. The term "chirp" is also used to designate a temporally stretching.

The treatment performed by a stretcher can be called a phase shaping. Throughout the text, the term phase designates a spectral phase.

A stretcher can also perform an amplitude-shaping, for example by introducing losses which differ depending on the wavelength of the wave.

A stretcher makes it possible for example to switch from a wave having a constant or linear (zero chirp) spectral phase to a wave having a quadratic spectral phase (purely linear chirp).

By "chirped pulse", it is meant a pulse of the stretched signal wave. For example, a pulse with an initial duration of 200 fs is stretched at 10 ns.

The stretcher 11 can be in the form of a fibre device (comprising for example a fibre Bragg grating), or a free space device (comprising for example a diffraction grating or a dispersive material). A stretcher is a device well known to those skilled in the art.

A source 12 provides a pump wave $S_p$ consisting, for example, of square time pulses with a width of 10 ns.

The pump wave $S_p$ and the stretched signal wave $S_{0e}$ are injected into a non-linear optical fibre 13, having a 3 order non-linearity. The non-linear optical fibre 13 makes a four wave mixing from two photons of the pump wave and one photon of the stretched signal wave. Thus, at the output of the fibre 13, an output signal wave $S_{Ae}$ is obtained, corresponding to the amplifier stretched input signal wave. In other words, the four wave mixing makes an energy transfer from the pump wave $S_p$ to the stretched signal wave $S_{0e}$ and to a so-called idler wave. The fibre 13 is for example a micro-structured optical fibre more than one hundred meters long, the scattering of which meets the phase matching condition between the pump wave and the input signal wave.

The output signal wave $S_{Ae}$ is then brought to a compressor 14, which reduces its temporal width to best approximate the temporal width of the input signal wave $S_0$. At the output of the compressor, an amplified signal wave $S_A$ corresponding to the input signal wave, but having a much higher intensity, is obtained.

FIGS. 2A and 2B schematically illustrate the chirp pulse amplification principle.

In these figures, the optical frequency f is drawn in abscissa, and the gain G is drawn in ordinate (in logarithmic scale). The pump wave $S_p$ is a monochromatic wave having the frequency $f_p$. When it is injected in the non-linear optical fibre 13, it generates two gain lobes on either side of the frequency $f_p$. A first gain lobe L1 corresponds to a gain band on the low frequency side. A second gain lobe L2 corresponds to a gain band on the high frequency side. The stretcher signal wave $S_{0e}$ is located in either of the lobes L1, L2 (see FIG. 2A). At the output of the non-linear optical fibre 13, the output signal wave $S_{Ae}$, and a so-called idler wave C, frequency symmetric of $S_{Ae}$ relative to the pump wave $S_p$ (see FIG. 2B) are obtained.

This fibre optical parametric chirped amplifier enables an input signal wave $S_0$ having a high spectral wave to be amplified, thanks to the gain lobes also having a high spectral width. For example, an input signal wave can be amplified with a gain of 30 dB, or more than 8 nm of its spectrum. The pulses of the amplified signal wave, output from the compressor, then have a duration of 660 fs.

One drawback of this amplification system is that it does not enable pulses of an amplified signal wave, having a temporal width lower than several hundreds of femto-seconds to be obtained.

One purpose of the present invention is to provide an amplifier enabling pulses of an amplified signal wave, having a temporal width lower than 500 fs, and even lower than 100 fs (where 1 fs=$10^{-15}$ s) to be obtained.

DISCLOSURE OF THE INVENTION

This purpose is achieved with an optical parametric chirped pulse amplification device, comprising a waveguide arranged to receive as an input the chirped pulses called a stretched signal wave, and to provide an output signal wave resulting from a four wave mixing.

The device according to the invention comprises:
  emitting means, for emitting non-monochromatic light pulses called a pump wave; and
  means for shaping a wave comprising a first stretcher, arranged to receive as an input the pump wave, and to output a stretched pump wave;
  the waveguide being arranged to further receive as an input the stretched pump wave.

Preferably, the emitting means are arranged to emit a pump wave having a spectral width higher than or equal to one nanometer.

The ratio of a chirp of the stretched signal wave to a chirp of the stretched pump wave is advantageously defined, according to a first order approximation, by:

$$\alpha_S = -\frac{3\beta_3(w_{s0} - w_{p0})}{\beta_4(w_{s0} - w_{p0})^2 + 6\beta_2}\alpha_P,$$

with
  $\alpha_s$ the chirp of the stretched signal wave;
  $\alpha_p$ the chirp of the stretched pump wave;
  $w_{s0}$ the centre pulse of the input signal wave;
  $w_{p0}$ the centre pulse of the pump wave;
  $\beta_2$, $\beta_3$, $\beta_4$, the coefficients of the 0, 1 and 2 order terms, in the Taylor expansion, around the value $w_{p0}$, of the second order scattering coefficient of the waveguide.

The invention also relates to a system comprising an optical parametric chirped pulse amplification device according to the invention, wherein the emitting means are arranged to further emit light pulses called an input signal wave. The system according to the invention comprises:
- a second stretcher, arranged to receive as an input the input signal wave, and to output the stretched signal wave, and
- a compressor, arranged to temporally compress the output signal wave.

The emitting means can comprise a single source of light pulses, to emit an initial pulsed light beam.

According to a first embodiment of the invention, the emitting means further comprise spectral selection means, arranged to separate two spectral contributions of the initial pulsed light beam, a first spectral contribution forming the pump wave, and a second spectral contribution forming the input signal wave.

According to a first alternative of this first embodiment, the emitting means further comprise:
- separating means, arranged to separate two amplitude contributions of the initial pulsed light beam, a first amplitude contribution forming the input signal wave; and
- spectral shifting means, arranged to receive as an input a second amplitude contribution, and to output the pump wave.

According to a second alternative of this first embodiment, the emitting means comprise:
- a first source of light pulses, to emit the pump wave; and
- a second source of light pulses, to emit the input signal wave;
- the first and second sources of light pulses being connected to each other by pulse synchronisation means.

According to a second embodiment of the invention, the means for shaping a wave further comprise amplitude and/or phase-shaping means for a pulse envelop envelope.

Finally, the invention relates to an optical parametric chirped pulse amplification method, comprising a step of temporally stretching light pulses, so as to provide the chirped pulses called a stretched signal wave. The method according to the invention also comprises the following steps of:
- temporally stretching light pulses called a pump wave, to provide a stretched pump wave; and
- four wave mixing the stretched pump wave and the stretched signal wave.

BRIEF DESCRIPTION OF THE DRAWINGS

The present invention will be better understood upon reading the description of exemplary embodiments given by way of purely indicating and in no way limiting purposes, making reference to the appended drawings in which.

DETAILED DISCLOSURE OF PARTICULAR EMBODIMENTS

Figure 1:
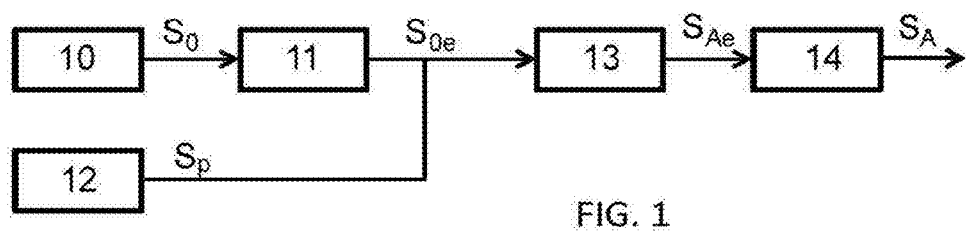
FIG. 1 schematically illustrates a fibre optical parametric chirped pulse amplifier according to prior art.
Figure 2A:
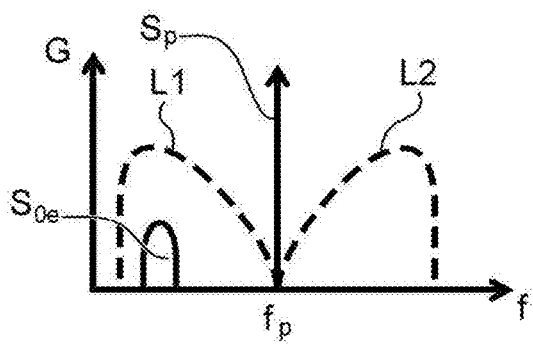
FIGS. 2A and 2B illustrate the mode of operation of a fibre optical parametric chirped pulse amplifier according to prior art.
Figure 2B:
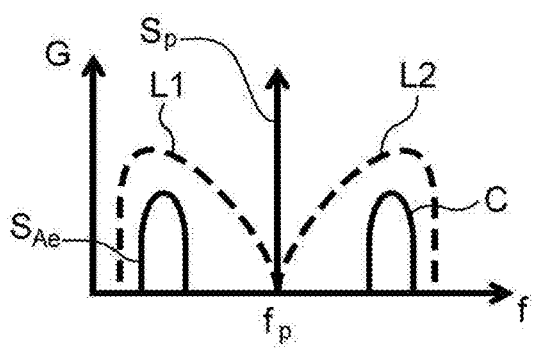
Figure 3:
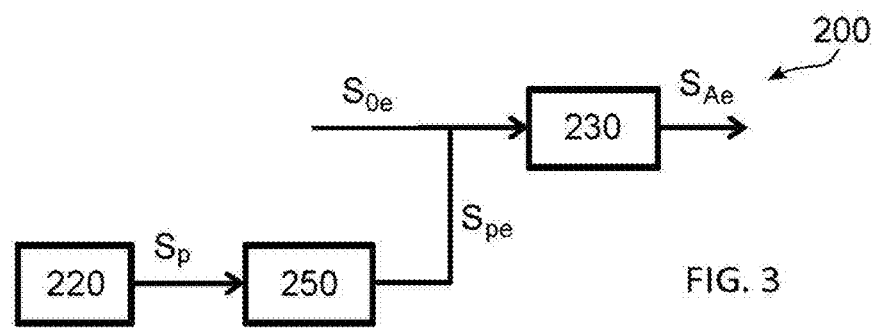
FIG. 3 schematically illustrates a fibre optical parametric chirped pulse amplification device according to the invention.

In FIG. 3 is schematically illustrated a fibre optical parametric chirped pulse amplification device 200 according to the invention.

The device 200 according to the invention comprises:
- emitting means 220, for emitting non-monochromatic light pulses, called pump pulses or pump wave $S_p$; and
- means for shaping a wave including a first stretcher 250.

The shaping means receive as an input the pump wave, and output a stretched pump wave $S_{pe}$. The stretcher 250 is of the type described in the introductive part. The pump wave $S_p$ is not monochromatic. The stretched pump wave $S_{pe}$ corresponds to the pump wave in which the frequencies are continuously distributed under a temporal envelope.

The device 200 also comprises a waveguide, herein consisting of a non-linear optical fibre 230. The fibre 230 receives as an input the pulses of the stretched pump wave $S_{pe}$, and chirped pulses such as those described in the introductive part, called a stretched signal wave $S_{0e}$. The non-linear optical fibre 230 has a 3 order non-linearity (non-centro-symmetry medium). It makes a four wave mixing involving two photons of the stretched pump wave $S_{pe}$ and one photon of the stretched signal wave $S_{0e}$. This four wave mixing makes an energy transfer from the stretched pump wave $S_{pe}$ to the stretched signal wave $S_{0e}$ and to a so-called idler wave. The non-linear optical fibre 230 is for example a micro-structured optical fibre more than ten meters long.

Thus, at the output of the non-linear optical fibre 230 is obtained an output signal wave $S_{Ae}$ corresponding to the amplified stretched input signal wave.

Throughout the text, the example of a waveguide consisting of a non-linear optical fibre will be considered. This example however is in no way limiting, and many alternatives implementing another waveguide type able to make a four wave mixing involving two photons of the stretched pump wave $S_{pe}$ and one photon of the stretched signal wave $S_{0e}$ could be contemplated. Non-cylindrical geometry waveguides comprise for example a strip waveguide or a dielectric waveguide. Throughout the text, the term "waveguide" designates an optical waveguide.

Figure 4:
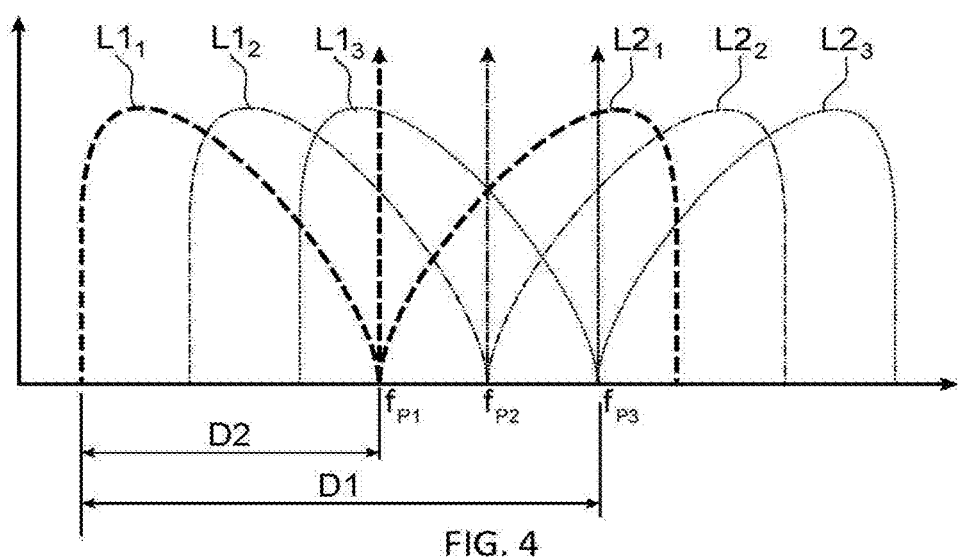
FIG. 4 illustrates the mode of operation of a fibre optical parametric chirped pulse amplification device according to the invention.

FIG. 4 schematically illustrates the principle implemented in the device according to the invention.

As detailed in the introductive part, in the case of a monochromatic pump wave, two gain lobes L1 and L2 can be obtained on either side of the frequency of the pump wave. Each lobe typically has a width of a few THz (at −3 dB from the maximum gain).

According to the invention, and by virtue of the stretcher 250:
- at an instant t1, the pump wave has a frequency $f_{P1}$, and two gain lobes $L1_1$, $L2_1$, are obtained on either side of the frequency $f_{P1}$ (bold dotted lines);
- at an instant t2, the pump wave has a frequency $f_{P2}$, and two gain lobes $L1_2$, $L2_2$, are obtained on either side of the frequency $f_{P2}$ (thin mixed lines);
- at an instant t3, the pump wave has a frequency $f_{P3}$, and two gain lobes $L1_3$, $L2_3$, are obtained on either side of the frequency $f_{P3}$ (thin dotted lines);
- etc.

Thus, a series of temporally and spectrally continuously shifted gain lobes are obtained. Preferably, the wave to be amplified (located under the lobes $L1_1$ to $L1_3$ or $L2_1$ to $L2_3$) is spectrally separated from the pump wave (sets of $f_{P1}$).

The total extent of the series of left (or right) lobes has a spectral width D1, much higher than the spectral width D2 of a single one of the left (or right) lobes. The spectral width D1 corresponds to the gain band, temporally distributed, of a device according to the invention.

The input signal wave can thus be amplified on a wide spectrum with the proviso that at each instant, in the non-linear optical fibre 230, a spectrum portion of the stretched pump wave adapted to a spectrum portion of the stretched signal wave flows.

In other words, in the non-linear optical fibre 230, the input signal wave can be amplified on a wide spectrum with the proviso that at each instant, a stretched pump wave and the stretched signal wave have respective spectral phases adapted to each other. Each part of the temporal profile of the stretched signal wave is amplified by a well determined gain. This gain is adjustable by the chirp and the spectral width of the stretched pump wave. The position of the lobes depends on the centre frequency of the pump wave, the power of the pump wave and its scattering in the fibre 230.

A wide spectrum corresponds to a low temporal width. The invention thus enables, with a high gain and without spectral narrowing by the gain, pulses having low temporal width to be amplified.

In particular, with a gain higher than or equal to 30 dB, pulses with a duration lower than 100 fs can be amplified, without spectral narrowing by the gain.

So-called ultrashort pulses can be amplified, with a duration between 10 fs and 100 fs, without spectral narrowing by the gain. The amplified pulses then also have a duration between 10 fs and 100 fs (output signal wave after temporal compression).

These performances are obtained using a device implementing a four wave mixing in a waveguide. The device according to the invention is thus robust and has low overall space.

The device according to the invention also enables amplified pulses having a strong contrast (ratio of the maximum intensity of the pulse to an intensity maximum from the maximum intensity of a pulse foot and the maximum intensity of a secondary peak) to be obtained.

The spectral width of the pump wave can be much lower than the spectral width of an input signal wave, since a single frequency of the pump wave enables an entire spectral band of the input signal wave to be amplified.

The pump wave advantageously has a spectral width in the order of one nanometer, for example higher than 0.5 nm or even 1 nm. The spectral width of the pump wave is for example between 0.5 nm and 5 nm.

The use of a pump wave with a wide spectrum goes against generally accepted ideas of those skilled in the art. Indeed, the non-linear process of the four wave mixing is all the more efficient as a good time covering is made between the pulses of the pump wave and the pulses of the stretched signal wave. Yet, pulses of the pump wave having a wide spectrum imply a low temporal width, hence a poor time covering with the pulses of the stretched signal wave, in the absence of a particular adaptation.

According to the invention, the stretcher lengthens the duration of the pulses of the pump wave, while preserving its spectral support. A good time covering can thus be made using short pulses of the pump wave, with a duration lower than about one hundred picoseconds. The emitting means for example provide pulses of the pump wave with a temporal width between 1 ps and 100 ps, which will then be widened temporally by the stretcher 250.

The conditions for obtaining the phase matching between the stretched pump wave and the stretched signal wave will now be detailed.

For a pump wave with a centre pulse $\omega_{p0}$ ($=2\pi f_{p0}$), the instant pulse of the stretched pump wave is written, according to a first order approximation:

$$\omega_p(t) = \alpha_p * t + \omega_{p0} \qquad (1)$$

where $\alpha_p$ is the chirp of the stretched pump wave.

For an input signal wave with a centre pulse $\omega_{s0}$ ($=2\pi f_{p0}$), the instant pulse of the stretched signal wave is written, according to a first order approximation:

$$\omega_s(t) = \alpha_s * t + \omega_{s0} \qquad (2)$$

where $\alpha_s$ is the chirp of the stretched signal wave.

The waveguide 230 has a non-linear coefficient $\gamma$, and the two order Taylor expansion around the value $\omega_{p0}$ of its second order scattering coefficient is written:

$$\beta_2(\omega) = \beta_2|_{\omega=\omega_{p0}} + \beta_3|_{\omega=\omega_{p0}}(\omega - \omega_{p0}) + \frac{1}{2}\beta_4\bigg|_{\omega=\omega_{p0}}(\omega - \omega_{p0})^2 \qquad (3)$$

Assuming: $\beta_2 = \beta_2|_{\omega=\omega_{p0}}$, $\beta_3 = \beta_3|_{\omega=\omega_{p0}}$, $\beta_4 = \beta_4|_{\omega=\omega_{p0}}$.

From the conservation equations of energy and momentum, the relationship between the centre pulse of the input signal wave and the centre pulse of the pump wave is deduced therefrom, to make an optimum energy transfer from the pump wave with a power P to the input signal wave, using a four wave mixing mechanism involving two photons of the pump wave, one photon of the stretched signal wave and a so-called idler photon:

$$\omega_{s0} = \omega_{p0} \mp \sqrt{\frac{2}{\beta_4}\left(-3\beta_2 \mp \sqrt{9\beta_2^2 - 6\beta_4\gamma P}\right)} \qquad (4)$$

Equation (4) is known, and determines, in prior art, a value of the centre pulse of the input signal wave relative to the pulse of the pump wave. According to the invention, the pump wave is of a wide spectrum, and equation (4) connects the centre pulse of the input signal wave to the centre pulse of the pump wave.

The first sign $\mp$ corresponds to the fact that there are two gain lobes located on either side of the centre frequency of the pump wave. Either solution is chosen depending on the readily commercially available wavelengths. The second sign $\mp$ corresponds to the different possible cases depending on the signs of $\beta_2$ and $\beta_4$ (for example $\beta_2<0$ and $\beta_4>0$).

From the preceding equations, a relationship between the chirp of the stretched signal wave and the chirp of the stretched pump wave could be determined, enabling an optimum energy transfer to be made (phase matching in the waveguide), using a device according to the invention:

$$\alpha_S = -\frac{3\beta_3(\omega_{s0} - \omega_{p0})}{\beta_4(\omega_{s0} - \omega_{p0})^2 + 6\beta_2}\alpha_p \quad (5)$$

This equation is obtained in particular from the equations (1) and (2). This is also a 1 order approximation, but which is sufficient to obtain very satisfactory results.

Thus, the stretcher 250, and a stretcher (not represented in FIG. 3) providing the stretched signal wave, are adjusted to each other, and for a determined waveguide, in order to make at each instant the phase matching required to the energy transfer searched for.

For this, those skilled in the art will be readily able to adjust a chirp fed by a stretcher, and/or determine the characteristics of a waveguide.

The stretcher 250, and a stretcher providing the stretched signal wave, are also adjusted one relative to the other such that the duration of a pulse of the stretched signal wave is substantially equal to the duration of a pulse of the stretched pump wave.

More generally, it can be simply said that the stretcher 250, and a stretcher providing the stretched signal wave, are adjusted one relative to the other such that the spectral phases of the stretched pump wave and the stretched signal wave are matched with each other (phase matching for a four wave mixing).

Figure 5:
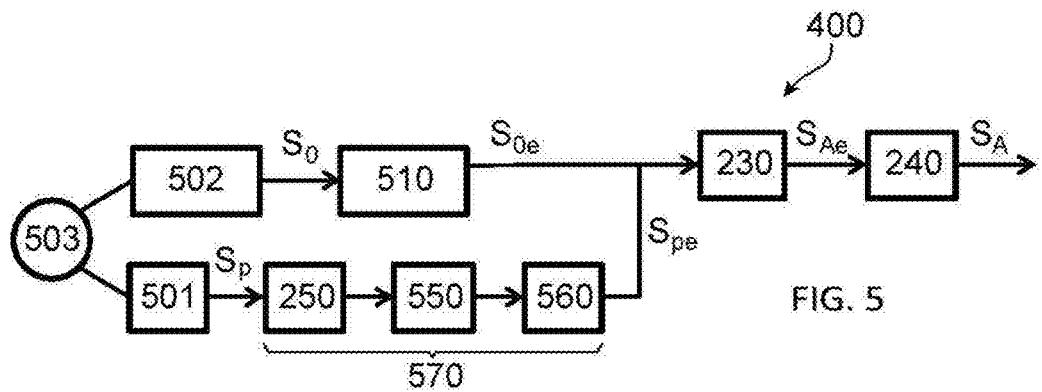
FIG. 5 illustrates a first embodiment of a fibre optical parametric chirped pulse amplification system according to the invention.

FIG. 5 illustrates a first embodiment of a fibre optical parametric chirped pulse amplification system according to the invention.

The system 400 comprises:
a device 200 according to the invention;
the means for producing chirped pulses that will be amplified; and
a compressor.

The system 400 can be fully fibred.

In the example represented in FIG. 5, the emitting means comprise:
a first laser 501, emitting the pump wave $S_p$, with a spectrum of about 2 nm wide; and
a second laser 502, emitting the input signal wave $S_0$, corresponding to pulses with a duration lower than 100 fs, and a spectrum of about 30 nm wide.

The first laser 501 and the second laser 502 are synchronised relative to each other by synchronisation means 503. These means 503 consist for example of a system for automatically controlling a laser cavity on the repetition frequency of the other laser cavity. This automatic control enables the cavity length of a second laser to be adjusted, to the cavity length of a first laser, and the cavity length of the first laser can vary very slightly over time depending on the conditions of use.

The first laser 501, the second laser 502, and the synchronisation means 503, form together emitting means, enabling both the input signal wave $S_0$ and the pump wave $S_p$ according to the invention to be produced.

The first laser 501 emits pulses with a duration in the order of one picosecond, with a centre wavelength shifted with respect to the centre wavelength of the pulses emitted by the second laser 502. It is reminded that the wavelength $\lambda$ and the frequency f are related as:

$$\lambda = \frac{c}{f},$$

where c is the velocity of light under vacuum.

The system 400 according to the invention also comprises as a second stretcher 510, receiving as an input the input signal wave and outputting the stretched signal wave $S_{0e}$. The pulses of the stretched signal wave have a temporal width in the order of one nanosecond. Likewise, the pulses of the stretched pump wave have a temporal width in the order of one nanosecond. The temporal stretching made by the stretcher 510 is thus higher than the temporal stretching made by the stretcher 250.

As set out with reference to FIG. 3, an output signal wave is obtained at the output of the non-linear optical fibre 230.

The output signal wave is brought to a compressor 240, which reduces the temporal width of the output signal wave $S_{Ae}$ to best approximate the temporal width of the input signal wave $S_0$. An amplified signal wave $S_A$, corresponding to the input signal wave, but with a much higher intensity is obtained at the output of the compressor.

The compressor 240 consists for example of a grating compressor. In order to improve compression, a phase correction device can be added. A perfect compression fully cancels the previously introduced chirp. The compressor 240 enables, at the output, a wave having a constant spectral phase or which is a purely linear function of the pulse to be retrieved. Thus, pulses which have a time form close to the Fourier Transform of their spectral amplitude is obtained at the output of the compressor 240.

In the example represented in FIG. 5, the system 400 according to the invention also comprises at least one amplifier 550. The amplifier 550 is not necessary, and it could merely be provided that the first laser 501 directly provides a wave having a greater intensity than the second laser 502.

In FIG. 5 are also represented amplitude- and/or phase-shaping means 560, for shaping the pulse envelope of the stretched pump wave provided to the optical fibre 230.

The stretcher 250, the amplifier 550, and the amplitude and/or phase shaping means 560 form together means 570 for shaping a wave according to the invention.

The amplitude- and/or phase-shaping means 560 enable the amplitude and/or the phase of the pulses of the stretched pump wave $S_{pe}$ to be adjusted, in order to optimise the efficiency of the four wave mixing process, or in order to obtain gain lobes having an optimised shape, for example of a top flattened shape.

Alternatively, it could be contemplated to adjust the amplitude and/or phase of the stretched signal wave. This adjustment would change the amplitude (envelope shape) and/or the phase of the amplified signal wave $S_A$, in comparison with the input signal wave. These changes should be compensated for, which is not necessary when it is the pump wave which is amplitude- and/or phase-shaped.

The shaping means 560 can be a passive component, for example a fibre Bragg grating, a micro-structured fibre, an amplitude or phase mask placed in the stretcher 250. The characteristics of the passive component are preferentially set after a calibration step during which the characteristics affording to obtain the result desired at the output of the system 400 according to the invention are determined.

Alternatively, the shaping means 560 can be an active component, for example a phase or amplitude fibre modulator driven by an arbitrary function generator, a light spatial modulator placed in the stretcher 250, a programmable dispersive acousto-optical filter, etc. In this case, the shaping means 560 are advantageously connected to means for measuring a characteristic of the wave at the output of the system 400, and to means for calculating the value of a feedback to be applied to the shaping means 560 to obtain the desired wave.

Figure 6:
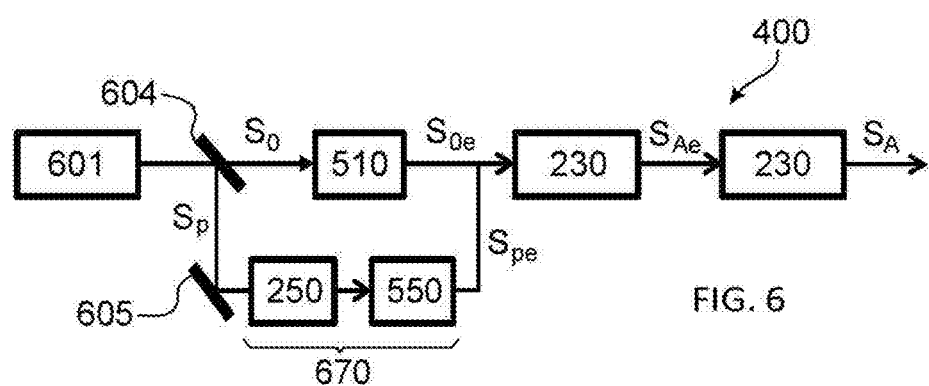
FIG. 6 illustrates a second embodiment of a fibre optical parametric chirped pulse amplification system according to the invention.

FIG. 6 illustrates a second embodiment of the system 400 according to the invention. FIG. 6 will only be described as regards its differences from FIG. 5.

In FIG. 6, the system 400 does not have shaping means 560, but alternatives comprising shaping means 560 could however be provided.

The stretcher 250 and the amplifier 550 form together shaping means 670 according to the invention.

The emitting means consist this time of a single laser oscillator 601. This single laser oscillator 601 has a very wide spectrum (low duration of the pulses), for example more than 32 nm wide.

Spectral filtering means 604 make it possible to separate:
a wave corresponding to the selection of the spectral band of about 2 nm wide, corresponding to the pump wave $S_p$ according to the invention; and
a wave corresponding to the remaining spectral band, corresponding to the input signal wave $S_0$ according to the invention.

The single laser oscillator 601 and the spectral filtering means 604 form together emitting means, enabling both the input signal wave and the pump wave according to the invention to be produced.

Thus, a pump wave and an input signal wave being perfectly synchronous are obtained, without resorting to synchronisation means.

The spectral filtering means 604 consist for example of a fibre demultiplexer or a dichroic filter.

Reference numeral 605 simply designates a beam-folding mirror, for directing the pump wave to the stretcher 250.

Figure 7:
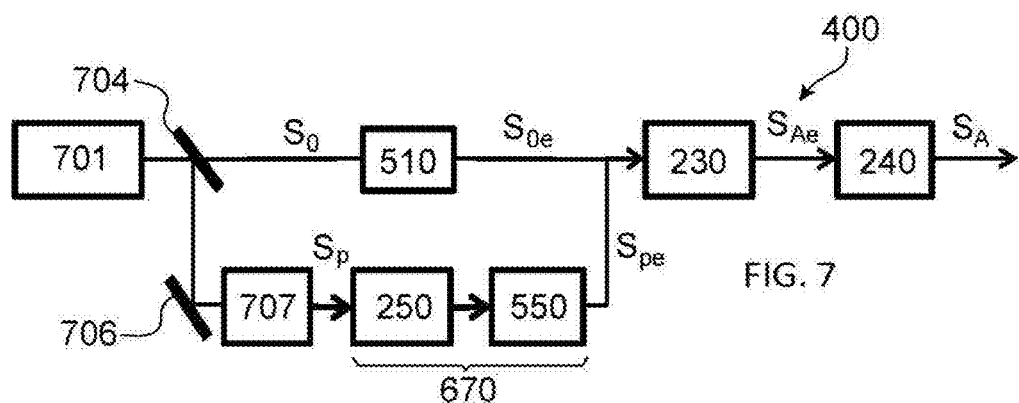
FIG. 7 illustrates a third embodiment of a fibre optical parametric chirped pulse amplification system according to the invention.

FIG. 7 illustrates a third embodiment of a system 400 according to the invention. FIG. 7 will only be described as regards its differences from FIG. 6.

As in FIG. 7, the emitting means consist of a single laser oscillator 701, emitting light pulses with a temporal width lower than 100 fs.

Separating means 704 make it possible to separate from each other:
a first amplitude contribution, corresponding to the input signal wave according to the invention; and
a second amplitude contribution.

The separating means consist for example of a fibre coupler or a beam splitter.

The second amplitude contribution is brought to spectral shifting means 707 (here, a beam-folding mirror 706). The spectral shifting means 707 enable a centre wavelength of the second amplitude contribution to be shifted, relative to the centre wavelength of the first amplitude contribution. The spectral shifting means 707 implement a non-linear effect such as Raman Effect. Such means are well known to those skilled in the art. A pump wave $S_p$ according to the invention is thus obtained at the output of the spectral shifting means 707.

The single laser oscillator 701, the separating means 704 and the spectral shifting means 707 form together emitting means, enabling both the input signal wave and the pump wave according to the invention to be produced.

Thus, a pump wave and an input signal wave being perfectly synchronous are obtained, without resorting to synchronisation means.

An exemplary implementation of the invention will now be illustrated with reference to FIGS. 8 and 9.

A non-linear optical fibre having the following characteristics is considered:
length: 28 nm;
non-linear constant $\gamma=2$ $W^{-1} \cdot km^{-1}$;
coefficients of the Taylor expansion of the second order scattering around the centre pulse of the pump wave (see equation (3)): $\beta_2=+1.10^{-28}$ $s^2/m$, $\beta_3=+2.10^{-40}$ $s^3/m$, $\beta_4=-1.10^{-55}$ $s^4/m$.

Such characteristics can be obtained for example thanks to the manufacturing technology of micro-structured fibres.

The energy transfer made by non-linear effect in the optical fibre is simulated by solving the non-linear Schrodinger equation (including scattering terms up to the 4 order, the non-linear terms, and the Raman response). For this, models well known to those skilled in the art are used, these models having been validated in the case of chirped pulses.

The pump wave has the following characteristics:
centre wavelength: 1064 nm;
spectral width: 2 nm;
temporal shape: 10 order super Gaussian (flattened Gaussian) and with a duration of 880 ps after linear chirp;
peak power: 100 W.

A gain of 30 dB is thus generated on a width of more than 20 THz (that is about 70 nm around 1030 nm). This gain spectral width is then sufficient to amplify an ultrashort pulse around 1030 nm.

Figure 8:
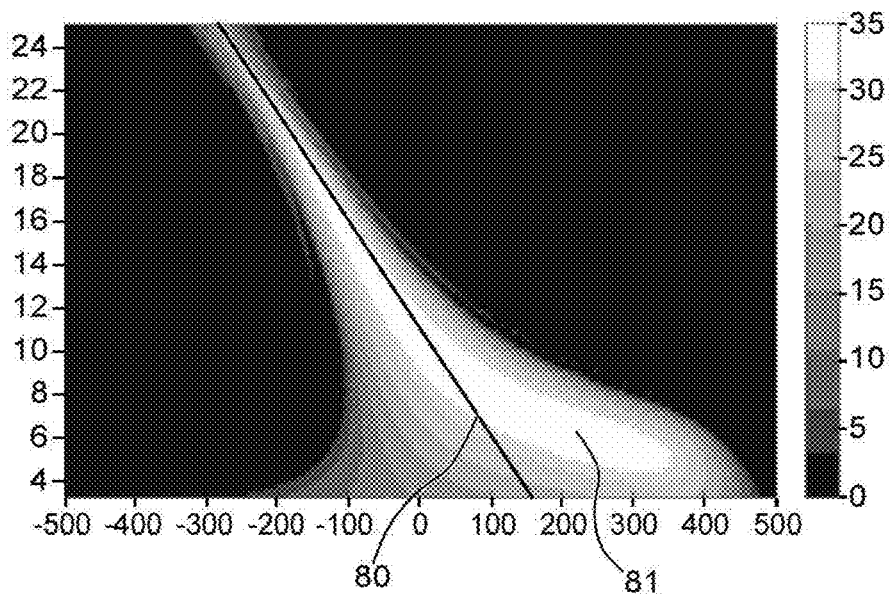
FIG. 8 illustrates an example of gain obtained using a fibre optical parametric chirped pulse amplification device according to the invention.

FIG. 8 illustrates the parametric gain obtained. The abscissa axis corresponds to a time, in picoseconds. The ordinate axis corresponds to a frequency shift, in THz. A third dimension (grey level) enables the gain value to be illustrated. On the right, a scale to relate a grey level to a gain value, in dB, has been represented.

A white zone 81, around a straight line 80, corresponds to a gain higher than 30 dB.

The zone 81, in a comma shape, is surrounded by increasingly dark bands as the gain tends to zero.

The straight line 80 has the slope $\alpha_s$ and for y-intercept $\omega_{s0}$ (see equation (2): $\omega_s(t)=\alpha_s*t+\omega_{s0}$).

The fact that the zone 81 has a comma shape, close to a perfectly linear shape, illustrates the fact that a good approximation is made considering that $\omega_s(t)=\alpha_s*t+\omega_{s0}$.

The difference between a comma shape and a straight line shape illustrates the error brought about by this approximation. This error can be decreased by adjusting the amplitude and/or phase of the stretched pump wave such that it adapts to the comma shape of the gain curve. For this, amplitude- and/or phase-shaping means 560 as described with reference to FIG. 5 are used. Alternatively, the amplitude and/or phase of the stretched signal wave could be adjusted to switch the gain curve from a comma shape to a straight line shape.

After parametric amplification, the pulse is compressed by a compressor (dispersive device comprising a grating compressor, and a phase correction device). The chirp is thus cancelled, such that the final pulse obtained (amplified signal wave) has a time shape close to the Fourier Transform of its spectral amplitude.

Figure 9:
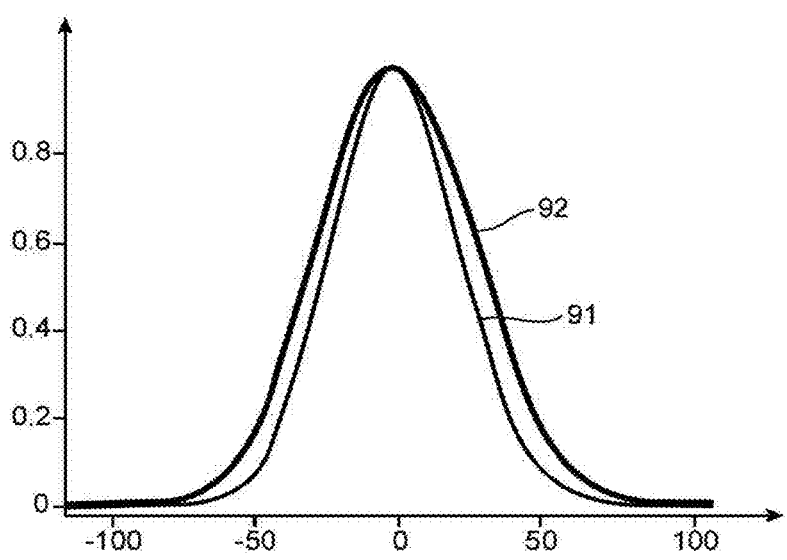
FIG. 9 illustrates an example of initial and final pulse shapes, at an input and an output of a fibre optical parametric chirped pulse amplification device according to the invention.

FIG. 9 illustrates an initial pulse belonging to the input signal wave $S_0$ (curve 91), and a final pulse belonging to the amplified signal wave $S_A$ (curve 92), after compression.

Both pulses are amplitude-normalised, such that their respective temporal widths can be readily compared.

The initial pulse has a Gaussian shape, with a spectral width 30 nm, centred at about 1030 nm, with a temporal width 50 fs, and a peak power 1 mW. Its temporal width after scattering is equal to 200 ps. This pulse is parametrically amplified with the gain represented in FIG. 8.

The final pulse obtained has a final temporal width equal to 60 fs. A very slight temporal widening and a very low spectral narrowing are thus obtained, in spite of a gain of 30 dB.

The invention finds numerous applications in the field of photonics and ultrashort lasers, but also in other fields in which ultrashort pulses with high energy can be desired, for example:

- to improve a time resolution in stroboscopy;
- to make new experiments on laser-matter interaction under an intense field, for example, in plasma physics;
- to improve micro-surgery, micro-machining, pollutant detecting, optical telecommunications, coherent optical tomography, etc., devices.

The invention claimed is:

1. A system, comprising:
    an emitting means, configured to emit non-monochromatic light pulses, named a pump wave, and to further emit light pulses, named an input signal wave;
    a means for shaping a wave comprising a first stretcher, configured to receive as an input the pump wave, and to output a stretched pump wave;
    a second stretcher, configured to receive as an input the input signal wave, and to output chirped pulses, named a stretched signal wave, the second stretcher being different than the first stretcher;
    a waveguide configured to receive as an input the stretched signal wave and the stretched pump wave, and to provide an output signal, named an output signal wave, resulting from a four wave mixing; and
    a compressor configured to temporally compress the output signal wave,
    wherein the waveguide, the emitting means, and the means for shaping together form an optical parametric chirped pulse amplification device.

2. The system according to claim 1, wherein the emitting means is configured to emit a pump wave having a spectral width higher than or equal to one nanometer.

3. The system according to claim 1, wherein a ratio of a chirp of the stretched signal wave to a chirp of the stretched pump wave is defined, according to a first order approximation, by:

$$\alpha_S = -\frac{3\beta_3(w_{s0} - w_{p0})}{\beta_4(w_{s0} - w_{p0})^2 + 6\beta_2}\alpha_P,$$

with
- $\alpha_S$ is the chirp of the stretched signal wave, fed by the second stretcher,
- $\alpha_P$ is the chirp of the stretched pump wave, fed by the first stretcher,
- $w_{s0}$ is a center pulse of the input signal wave, emitted by the emitting means,
- $w_{p0}$ is a center pulse of the pump wave, emitted by the emitting means, and
- $\beta_2$, $\beta_3$, $\beta_4$ are the coefficients of the 0, 1 and 2 order terms, in a Taylor expansion, around the value $w_{p0}$, of a second order scattering coefficient of the waveguide.

4. The system according to claim 1, wherein the emitting means comprises a single source of light pulses, to emit an initial pulsed light beam.

5. The system according to claim 4, wherein the emitting means further comprises spectral selection means, configured to separate two spectral contributions of the initial pulsed light beam, a first spectral contribution forming the pump wave, and a second spectral contribution forming the input signal wave.

6. The system according to claim 4, wherein the emitting means comprises:
    a first source of light pulses, to emit the pump wave; and
    a second source of light pulses, to emit the input signal wave;
    the first and second sources of light pulses being connected to each other by pulse synchronisation means.

7. The system according to claim 1, wherein the emitting means further comprises:
    separating means, configured to separate two amplitude contributions of the initial pulsed light beam, a first amplitude contribution forming the input signal wave; and
    spectral shifting means, configured to receive as an input a second amplitude contribution, and to output the pump wave.

8. The system according to claim 1, wherein the means for shaping a wave further comprises amplitude and/or phase-shaping means for a pulse envelope.

9. The system according to claim 1, wherein the waveguide comprises a non-centro-symmetric medium.

10. The system according to claim 1, wherein the waveguide has a 3-order nonlinearity.

11. An optical parametric chirped pulse amplification method, comprising:
    temporally stretching non-monochromatic light pulses as a pump wave, to provide a stretched pump wave, by a first stretcher; and
    temporally stretching light pulses, to provide chirped pulses as a stretched signal wave, by a second stretcher;
    four wave mixing the stretched pump wave and the stretched signal wave; and
    outputting an output signal wave resulting from the four wave mixing, the output signal wave being temporally compressed.

12. The method according to claim 11, wherein a ratio of a chirp of the stretched signal wave to a chirp of the stretched pump wave is defined, according to a first order approximation, by:

$$\alpha_S = -\frac{3\beta_3(w_{s0} - w_{p0})}{\beta_4(w_{s0} - w_{p0})^2 + 6\beta_2}\alpha_P,$$

with
- $\alpha_s$ is the chirp of the stretched signal wave,
- $\alpha_P$ is the chirp of the stretched pup wave,
- $w_{s0}$ is a center pulse of the input signal wave,
- $w_{p0}$ is a center pulse of the pump wave, and
- $\beta_2$, $\beta_3$, $\beta_4$ are the coefficients of the 0, 1 and 2 order terms, in a Taylor expansion, around the value $w_{p0}$, of a second order scattering coefficient of the waveguide.

13. The optical parametric chirped pulse amplification method according to claim 11, wherein the four wave mixing involves two photons of the stretched pump wave and one photon of the stretched signal wave, and transfers energy from the stretched pump wave to the stretched signal wave and to another wave.

* * * * *